Figure 1:
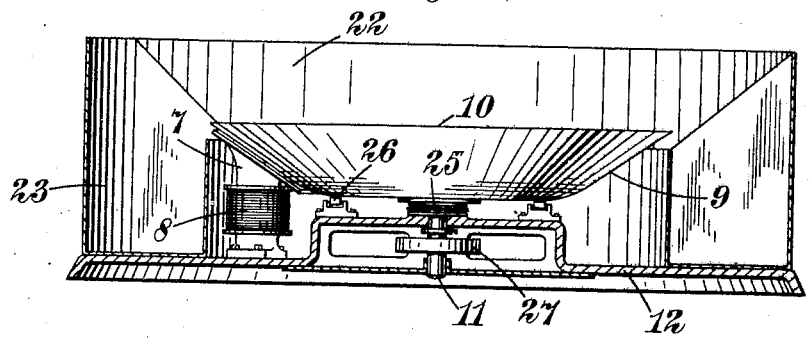

Sept. 10, 1929.  J. JOHNSTON  1,727,543
MAGNETIC SEPARATOR
Filed Aug. 25, 1927   3 Sheets-Sheet 1

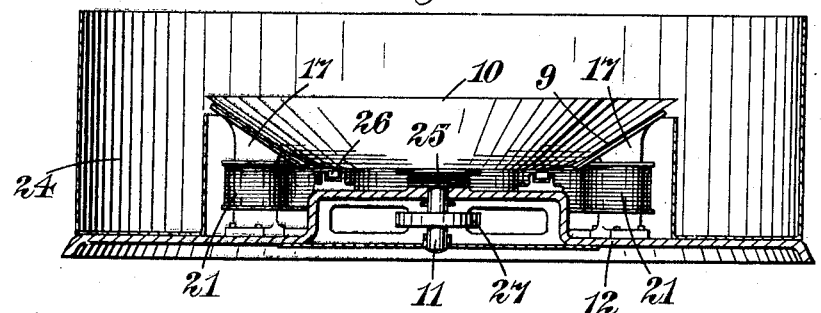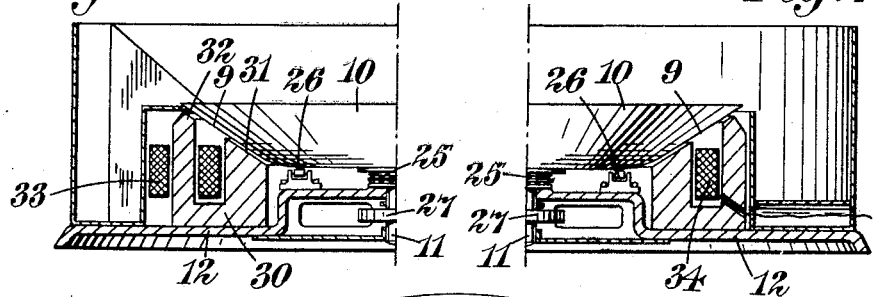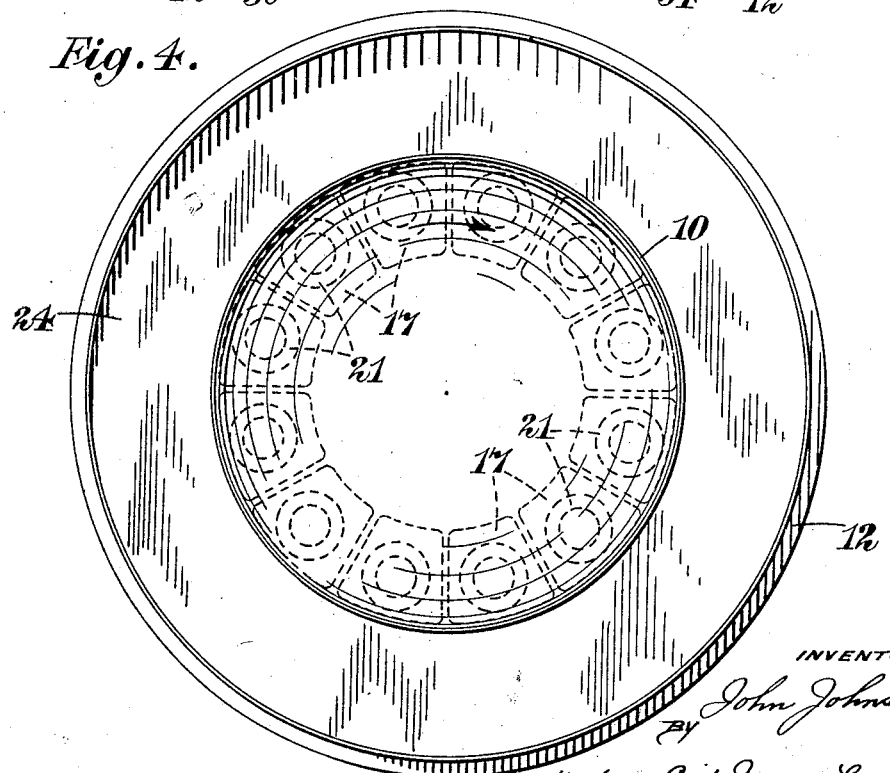

Patented Sept. 10, 1929.

1,727,543

UNITED STATES PATENT OFFICE.

JOHN JOHNSTON, OF LONDON, ENGLAND.

MAGNETIC SEPARATOR.

Application filed August 25, 1927, Serial No. 215,470, and in Great Britain September 1, 1926.

This invention comprises improvements in magnetic separators.

According to the invention a method of magnetic separation of mixed material is characterized by causing the material to be separated to pass under the influence of centrifugal force transversely across the lines of force of a magnetic field so that the action of the magnetic field causes a part of the material to be retained therein while the unacted-upon portion escapes.

The invention comprises a magnetic separator characterized by the provision of a rotatable separating pan to receive the material to be treated, said pan having a side wall which diverges outwardly from the axis of rotation toward the top and means to apply a magnetic field to the material within the rotating pan so that a portion of the material may be held therein by the magnetic field against the action of centrifugal force.

The rotating pan may be concentric with the axis of rotation, and the magnetic field may be of annular form around said axis. The material to be separated may be fed by a stationary feeder into the pan at the bottom of the side. The rotation of the pan tends to cause the material to go up the side and out of the pan by centrifugal force. The non-magnetic material does this at once, while the magnetic material is held on the side by electro-magnets which are outside the side of the pan, close to the side and stationary. The bottom and side of the pan are made of any suitable non-magnetic material.

The magnetic field may extend around a complete annular zone of the pan and may be produced by electro-magnets so that the material retained by the electro-magnets is kept in the pan as long as may be wished, but may be released upon shutting off the electric current therefrom.

This form of the separator is for material in which the magnetic portion is small in proportion to the whole of the material, e. g. for taking magnetic material out of cement, grain, tea etc., also potters' slip and other liquids. The electro-magnets are all round the side of the pan and only the non-magnetic material goes out of the pan when it is working normally. When it is wanted to take off the magnetic material the action of the electro-magnets is stopped while the pan rotates and the magnetic material goes off the pan by centrifugal force.

In an alternative form, the magnetic field extends around a part only of an annular zone of the pan so that material fed to the pan in said field is separated from its non-responsive portion during a part revolution of the pan and the material retained by the action of the magnets is discharged upon passing out of the part of the separating zone to which the magnetic field is applied.

This form of the separator is for material in which the magnetic portion is considerable in proportion to the whole of the material—pulverized ores of metals and other material the particles of which are small in size. Both kinds of material (the non-magnetic and the magnetic) go out of the pan in each revolution. The magnets are round only part of the side. As the mixed material—on the side—is passing these the non-magnetic portion goes away while the magnetic portion is held on the side until this magnetic portion is carried past the electro-magnets, when it goes up the side and out of the pan by centrifugal force. Though this form of the separator may be used also for material in which the magnetic portion is small in proportion to the whole of the material, the form of the separator previously mentioned will usually be preferred for this.

The accompanying drawings show, by way of example, various constructions in accordance with the invention.

Figure 2:
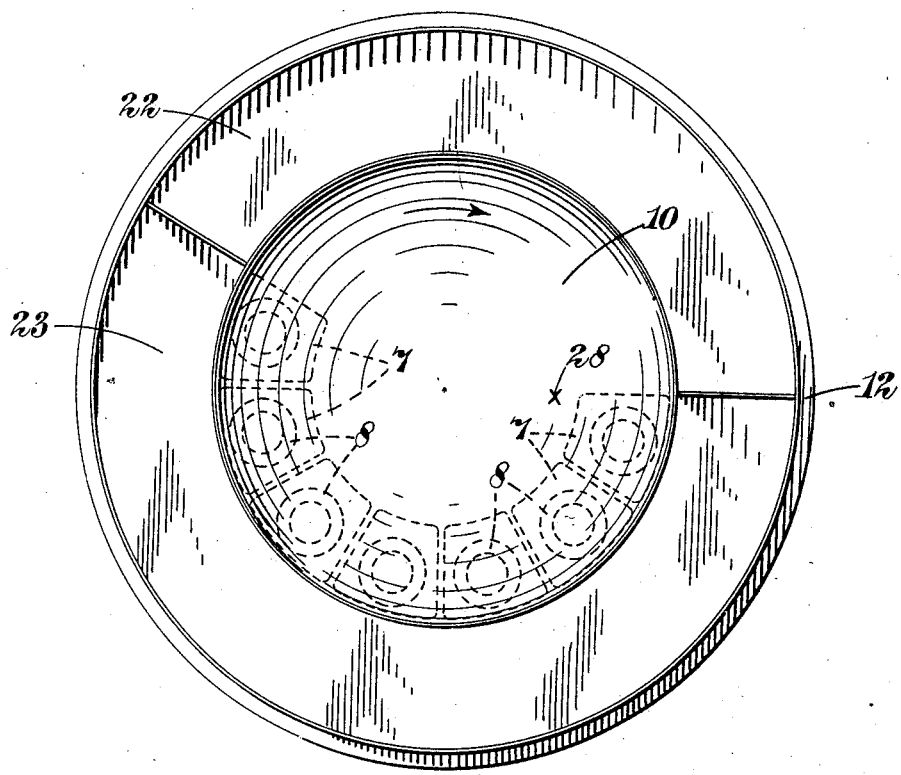
Figure 6:
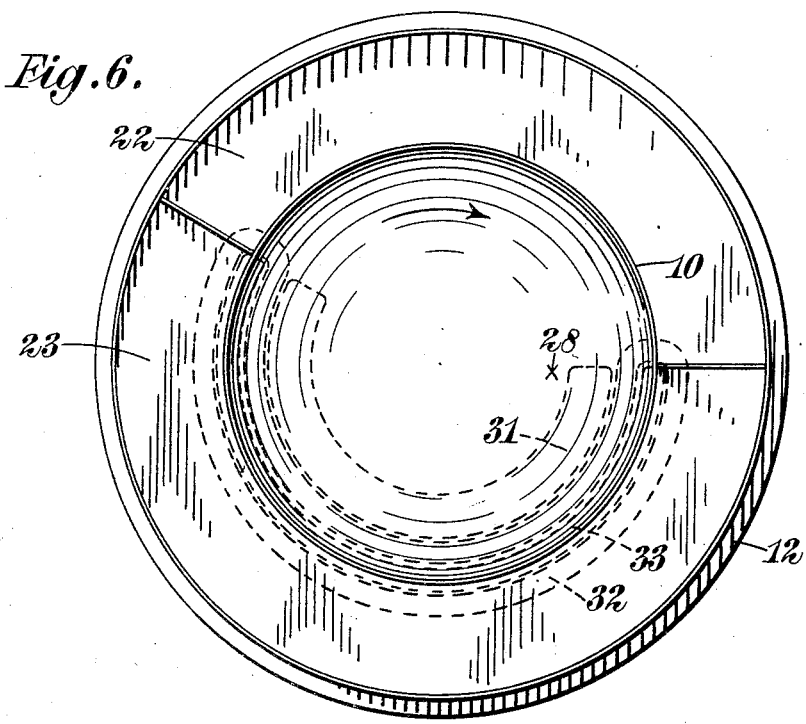
Figure 8:
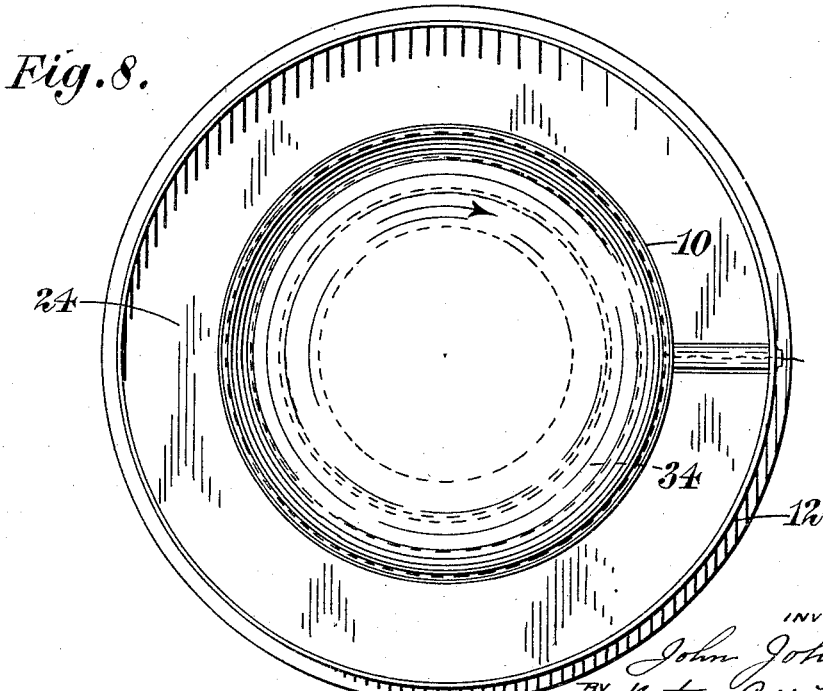

Figures 1 and 2 show one construction in sectional elevation and plan, respectively, Figures 3 and 4 are similar views of a second construction, Figures 5 and 6 are similar views of a third construction and Figures 7 and 8 are similar views of a fourth construction.

Referring to the construction illustrated in Figures 1 and 2, a rotatable separating pan 10 is supported concentrically upon a vertical shaft 11 and base-plate 12. The side wall of the pan 10 diverges outwardly as shown at 9. A number of electro-magnets 7 are disposed around the underside of the pan provided with windings 8. The electro-magnets extend around a sector which occupies three-fifths of the periphery of the pan as shown in Figure 2, and material is fed on to the pan close to the point at which it passes over the first of the magnets as indicated at 28, Figure 2. The pan is surrounded by two hoppers 22, 23, one of which encircles the portion of the pan to which the magnetic field is applied and the other encircles the remainder of the periphery.

In operation, the magnetic material is held on the pan by the field created by the magnets 7, and non-magnetic material is flung off by centrifugal force into the hopper 23. On passing out of the magnetic field the magnetic material is no longer held, but is itself flung off into the hopper 22.

The weight of the pan is supported by a ball-thrust bearing 25 at the centre and auxiliary rollers 26. Drive is imparted through the pulley 27. The electro-magnets 7 are all of the same polarity and it would, of course, be desirable in practice to complete the magnetic circuit by an extension of readily magnetizable material from the base of the magnets upwards to a point above the pan 10 in order to increase the strength of the field. Such constructional details may readily be varied within the scope of this invention to suit the needs of any particular apparatus or the convenience of the user.

Referring now to the construction illustrated in Figures 3 and 4, this is similar to that already described, with the exception that electro-magnets 17 provided with windings 21 are arranged all round the underside of the pan 10 and there is only a single hopper 24 outside the pan. In this case the material to be separated is fed into the pan towards the centre and the magnetic material is retained on the pan during a series of revolutions thereof while the non-magnetic material continuously passes off. When a sufficiency of magnetic material has been collected to render it desirable that this should be removed, the collecting hopper is emptied of the previously-separated non-magnetic material and thereafter the electric supply is cut off from the electro-magnets, whereupon the magnetic material is released and passes off by centrifugal force.

It is possible to modify the form of the magnets beneath the pan in many ways, and Figures 5 and 6 illustrate a modified construction in which a single part-annular magnet 30 is provided below the pan 10. This magnet has two poles 31 and 32 below the pan, so that the magnetic circuit is nearly complete and it is provided with a winding 33 which extends between the poles and back around the outside. If desired, such a magnet may be made a complete annulus, as illustrated in Figures 7 and 8, with the winding 34 inserted in the space between the poles. The outer pole of the magnet in Figures 5 to 8 is shown as narrower than the inner pole, so as to provide a more intense field around the periphery and thus hold any magnetic material which may have escaped the inner pole against the greater centrifugal force which exists at the edge of the pan.

Other modifications in construction may readily be made within the scope of this invention and, inter alia the angle which the side of the pan makes with the horizontal may be varied, other forms of electro-magnets may be employed, and the extent to which they encircle the pan in the construction illustrated in Figures 1, 2 and 6, may be varied.

I claim:

1. Apparatus for separating magnetic and non-magnetic material comprising a rotatable pan to receive the material to be treated, said pan having a side wall which diverges outwardly from the axis of rotation towards the top, means to rotate the pan, means for creating a magnetic field to act on the material in the pan, which field extends around a sector only of the side of the pan, means for feeding the material to be treated to the pan in the said sector of the magnetic field, whereby the non-magnetic material is centrifugally discharged from the pan and the magnetic material is retained in the pan until the part thereof to which it has been fed moves out of the magnetic field and is then separately discharged by centrifugal action.

2. Apparatus for separating magnetic and non-magnetic material comprising a rotatable pan to receive the material to be treated, said pan having a side wall which diverges outwardly from the axis of rotation towards the top, means to rotate the pan, means for creating a magnetic field to act on the material in the pan, which field extends around a sector only of the side of the pan, means for feeding the material to be treated to the pan at the point where the pan enters the said section of the magnetic field, whereby the non-magnetic material is centrifugally discharged from the pan and the magnetic material is retained in the pan until the part thereof to which it has been fed moves out of the magnetic field and is then separately discharged by centrifugal action.

3. Apparatus for separating magnetic and non-magnetic material comprising a rotatable pan to receive the material to be treated, said pan having a side wall which diverges outwardly from the axis of rotation towards the top, means to rotate the pan, means for creating a magnetic field to act on the material in the pan, which field extends around a sector only of the side of the pan, means for feeding the material to be treated to the pan at a point at the bottom of the diverging side wall thereof in the said sector of magnetic field, whereby the non-magnetic material is centrifugally discharged from the pan and the magnetic material is retained in the pan until the part thereof to which it has been fed moves out of the magnetic field and is then separately discharged by centrifugal action.

4. Apparatus for separating magnetic and non-magnetic material comprising a rotatable pan to receive the material to be treated, said pan having a side wall which diverges outwardly from the axis of rotation towards the top, means to rotate the pan, electromagnetic means fixed adjacent the under side of the pan along a part only of its circumferential dimension to create a magnetic field in the pan, a hopper for receiving non-magnetic material, said hopper being adjacent the edge of the pan and extending around the portion thereof that is in the magnetic field at any instant and a second hopper adjacent the edge of the pan and extending around the remaining portion of the circumference thereof for receiving the magnetic material.

5. Apparatus for separating magnetic and non-magnetic material comprising a rotatable pan to receive the material to be treated, said pan having a side wall which diverges outwardly from the axis of rotation towards the top, means to rotate the pan to discharge the non-magnetic material by centrifugal action, and means for creating a magnetic field passing through the pan, said means comprising a pole piece adjacent the pan, curved to conform to the shape of the pan and disposed concentrically with the axis of rotation of the pan, and means for energizing said pole piece.

6. Apparatus for separating magnetic and non-magnetic material comprising a rotatable pan to receive the material to be treated, said pan having a side wall which diverges outwardly from the axis of rotation towards the top, means to rotate the pan to discharge the non-magnetic material by centrifugal action, and means for creating a magnetic field passing through the pan, said means comprising a pair of pole pieces curved to conform to the shape of the pan and disposed concentrically with the axis of rotation of the pan and positioned to create a complete magnetic circuit passing through the pole pieces and pan, and an energizing winding for said circuit surrounding one of said pole pieces.

In testimony whereof I affix my signature.

JOHN JOHNSTON.